United States Patent [19]

Dawson

[11] E Re. 28,457

[45] Reissued *July 1, 1975

[54] COUPLING FITTING FOR CONNECTING TWO PIPES

[75] Inventor: James A. Dawson, New Orleans, La.

[73] Assignee: McDonnell Douglas Corporation, St. Louis, Mo.

[*] Notice: The portion of the term of this patent subsequent to Mar. 30, 1988, has been disclaimed.

[22] Filed: Oct. 25, 1972

[21] Appl. No.: 300,469

Related U.S. Patent Documents

Reissue of:

[64] Patent No.: 3,675,949
Issued: July 11, 1972
Appl. No.: 38,355
Filed: May 18, 1970

U.S. Applications:

[62] Division of Ser. No. 739,528, June 24, 1968, Pat. No. 3,572,779.

[52] U.S. Cl. ..... 285/354; 285/382.2; 403/285

[51] Int. Cl. ..... F16l 19/02

[58] Field of Search ..... 403/274, 279, 281, 285, 403/300, 314, 345; 29/517, 452; 285/382, 382.2, 385, 354; 287/109

[56] References Cited

UNITED STATES PATENTS

| | | | |
|---|---|---|---|
| 1,137,113 | 4/1915 | Bouchard | 285/354 X |
| 1,186,812 | 6/1916 | McFerran | 285/382.2 X |
| 1,186,813 | 6/1916 | McFerran | 285/382.2 X |
| 1,823,158 | 9/1931 | Mogford et al. | 403/274 X |
| 2,179,355 | 11/1939 | Scott | 285/382.2 X |
| 2,741,498 | 4/1956 | Elliott | 285/382.2 X |
| 2,910,983 | 11/1959 | Everett | 29/517 X |
| 3,091,982 | 6/1963 | Siebol | 285/382 UX |
| 3,378,282 | 4/1968 | Demler | 285/382 X |
| 3,474,519 | 10/1969 | Hallesy | 29/432 |
| 3,476,412 | 11/1969 | Demler, Sr. | 285/382.2 X |
| 3,572,779 | 3/1971 | Dawson | 285/382.2 |

*Primary Examiner*—Werner H. Schroeder
*Attorney, Agent, or Firm*—Gravely, Lieder & Woodruff

[57] ABSTRACT

A coupling for fluid conduits in which each end portion of two tubes to be connected is provided with a swaged-on adapter carrying the necessary means to connect or disconnect the tubes without disturbing the swaged-on adapter.

7 Claims, 5 Drawing Figures

COUPLING FITTING FOR CONNECTING TWO PIPES

Matter enclosed in heavy brackets [ ] appears in the original patent but forms no part of this reissue specification; matter printed in italics indicates the additions made by reissue.

---

This application is a division of my prior application, Ser. No. 739,528, filed June 24, 1968, and now U.S. Pat. No. 3,572,779, granted on Mar. 30, 1971.

This invention relates to improvements in fittings, couplings and the like for fluid and mechanical systems, and is particularly concerned with the method of making an assembly in which one part, having an external configuration capable of being transferred to the interior surface by swaging methods, is rigidly connected to a cooperating part.

While this improvement has application for effecting a mechanical connection between cooperating parts and for joining fluid conduits in a leak proof manner, it incorporates features which will overcome some of the more serious problems in the art of mechanical and leak proof connections. Up to now, fluid conduits have been welded or brazed together by expensive and complicated means, or have been connected together by threaded couplings. Typical connections are found in private residences as well as commercial and industrial installations, and include threaded couplings, tees, elbows and the like, and sweated or brazed fittings.

In the aerospace field the present improvement has overcome the problems of weight, vibration and mechanical stress so that reliability can be assured where high pressure is involved.

A principal object of this invention is to provide a fitting which will overcome the problems in the art above alluded to, and will do so by the unique application of materials and forming techniques to the creation of a permanent fitting for fluid tubing as well as for structural applications.

Another principal object of this invention is to provide a fitting for connecting two parts in which flexibility of design configuration is obtained through selection and treating of materials, and dimensions thereof.

Yet another object of this invention is to provide an improved fitting that by simple swaging technique can be applied to connect fluid conduits in a manner to make them resistant to tension and torsion stresses at high fluid pressure and to allow simplified checkout of assembled joints.

It is also an object of this invention to provide a fitting of the above character which will conserve space and be practical for application in congested areas.

Other objects of the invention will be pointed out in connection with the description of certain preferred embodiments shown in the drawings.

A typical embodiment of a coupling fitting comprises a sleeve member having a plain inner surface contour to receive the ends of two tubes to be connected and an external surface contour characterized by a plurality of grip bands which produce areas in the sleeve wall that are thickened relative to other areas. The sleeve member, after being positioned over the ends of the two tubes to be connected, is then swaged on its outside surface to a substantially uniform contour so as to transpose the plurality of grip bands to the inner surface of the sleeve member and to cause the grip bands to become imprinted on the tubes to be connected. Thus, by the swaging operation the initial external contour of the sleeve member is transferred to the inside where the tubes to be joined are deformed and securely gripped by the plurality of bands of thickened material. It is a particular feature of the typical embodiment to include means in the areas of increased thickness of the wall of the sleeve member to increase the grip exerted on the members or tubes to be connected. Such provisions may take the form of surface roughening or insert elements so that the final assembly has increased resistance to tension and torsion stress.

Another typical embodiment is to provide a pair of sleeve members each having the characteristics above described but in which the sleeve members may be joined by conventional threaded coupling elements so that there results a way of joining and separating two tubes or conduits at fittings that have the characteristics of the present invention.

Another typical embodiment comprises a sleeve member which has a plain inner-surface contour to join to tubes or members, and an external surface contour characterized by a plurality of grip bands variable in thickness, and being of hexagonal, octagonal, or of some other configuration so that, on being swaged, the external contour is transferred to the internal contour and produces a grip which is resistant to high torque stresses.

Figure 1:
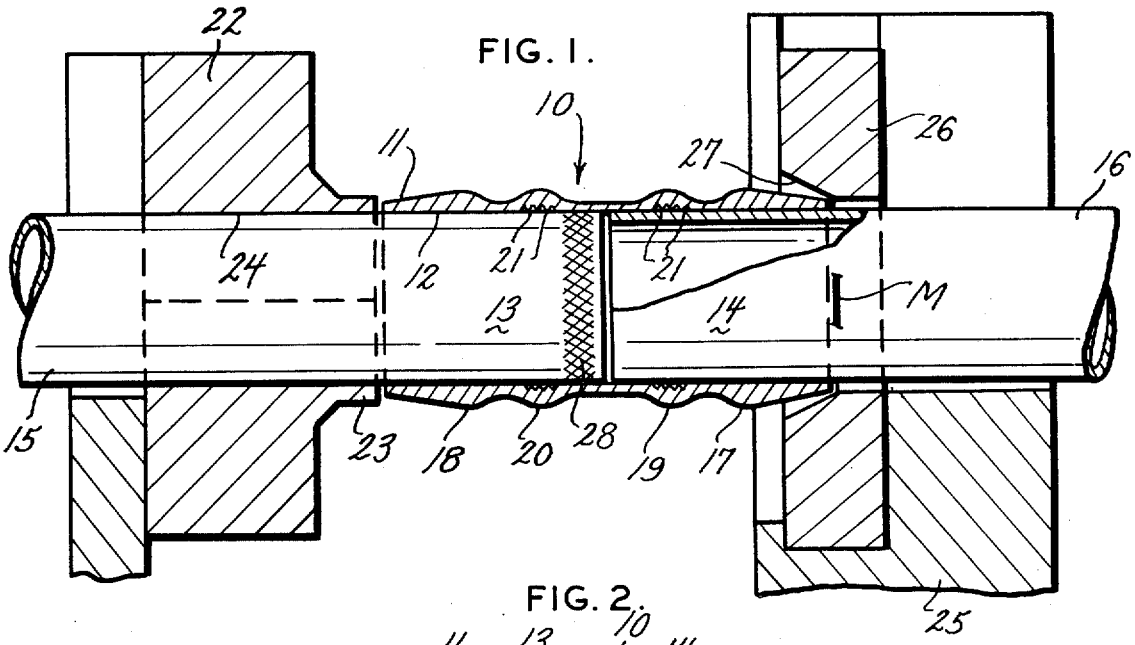
FIG. 1 is a longitudinal sectional view of a typical coupling fitting to join a pair of tubes, the view showing schematically the swaging tools by which the final connection is effected.

Referring now to the drawings and to FIG. 1 in particular, the presently improved coupling fitting 10 comprises a tubular sleeve member 11 having a plain cylindrical inner surface 12 suitable for receiving the adjacent ends 13 and 14 of tubes 15 and 16 respectively. The ends 13 and 14 have plain, grooved, or roughened cylindrical outer surfaces which are slideably received within the cylindrical inner surface 12 of sleeve 11 with insertion depth indicated by reference mark M or by other suitable means. Between the ends of sleeve 11 are provided grip bands 17 and 18 adjacent the ends of the sleeve and other grip bands 19 and 20 located inwardly of the opposite ends of the sleeve and opposite the adjacent ends 13 and 14 of the tubes. The grip bands 17 and 18, in the form shown, comprise annular areas of the wall of the sleeve 11 which are thickened and also tapered or given a large concave radius.

The bands vary in thickness from being narrow at the respective ends of the sleeve 11 to substantial thickness inwardly of the ends. The grip bands 19 and 20 are annular in transverse configuration and convex in cross section so as to form thickened areas in the side wall of the sleeve 11. The inner surfaces of the grip bands 19 and 20 are suitably roughened by being provided with a series of annular rings 21 which provide serrations.

In establishing a permanent connection between the tubes 15 and 16, it is preferred that either tube, in the present view of FIG. 1, be mounted in a split type base block 22 having a forwardly projecting portion 23 which forms an abutment for the adjacent end of the sleeve 11. The block 22 is provided with an internal passage 24 to receive the tube 15. The tube is, by preference, mounted in the swage block 22 with a portion of its end projecting outwardly beyond the projection portion 23 of the block. The fitting 10 may then be positioned over the tube 15 and brought into abutment with the projecting portion 23. The opposite tube 16 may then have its end 14 positioned within the cylindrical surface 12 of the fitting 10 and a moving block 25 is positioned over the tube 16 such that the split die 26 carried thereby has its tapered throat 27 adjacent the opposite external end of the sleeve 11. If desired, the ends 13 and 14 of the tubes 15 and 16 respectively may be roughened on the exterior surface as shown at 28 so as to improve the resistance to torsional stress applied to the tubes 15 and 16.

Figure 2:
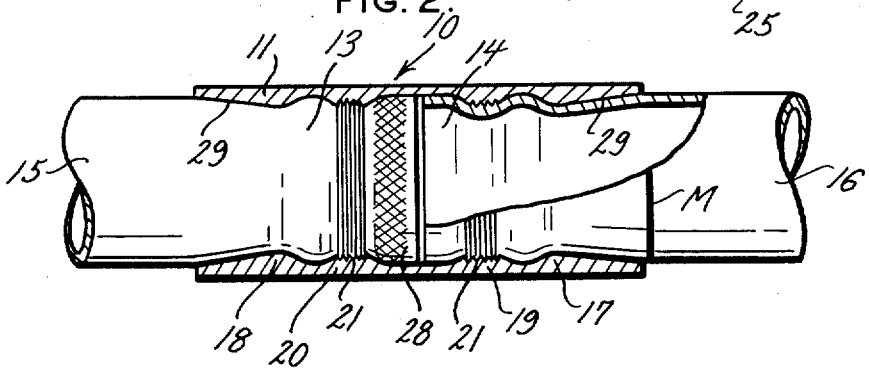
FIG. 2 is a view similar to FIG. 1, but showing the completed assembly of sleeve member and conduits to show the transposition of the external contour inwardly to the inner contour.

Having placed the several parts and elements in position as shown in FIG. 1, the required force is applied to the block 22 and its counterpart 25 to press the blocks toward each other. The sleeve 11 is retained by the projecting portion 23 of the block 22 during the movement of the block 25 along the outer contour of the sleeve 11. The resulting relative motion causes the tapered throat 27 of the die 26 to wipe along the outer surface of sleeve 11, transposing the contoured areas thereof inwardly so that what was a plain cylindrical inner surface 12 is made to conform to and have the configuration characteristics previously on the outer surface of the sleeve. This transposition is illustrated in FIG. 2 where the grip bands 17 and 18 are now pressed inwardly to deform the ends 13 and 14 of the tubes, and wherein the grip bands 19 and 20 are also moved inwardly to deform the ends 13 and 14 of the tubes and at the same time have the serrations 21, or metal inserts 34, (FIG. 3), bite into the tube ends 13 and 14 so as to increase the grip asserted by the sleeve 11 against tension stress that may be exerted on the tubes 15 and 16. The grip bands 17 and 18 which are of tapered or curved configuration and located adjacent the opposite ends of the sleeve 11, cooperate to provide "mirror image" tapered, curved, or contoured surfaces 29 on the inner surface of the sleeve 11 so as to minimize the creation of high stress zones adjacent the entrances to the sleeve 11 of the respective tubes 15 and 16.

Figure 3:
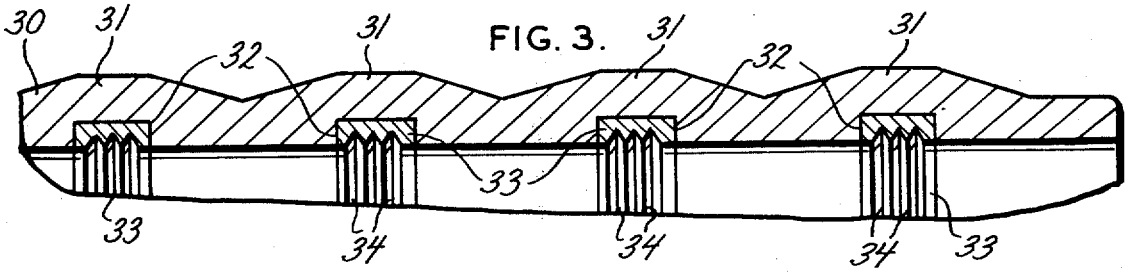
FIG. 3 is a greatly enlarged fragmentary sectional view of a sleeve member showing insert elements carried by the grip bands.

Turning now to FIG. 3, there is shown a preferred embodiment in which the sleeve member 30 is provided with a series of grip bands 31, some or all of which may be formed with an inner under cut channel 32 to receive an insert element 33 which is provided on its inner facing surface with annular serrations 34. Thus, the sleeve 11 of FIG. 2 might be modified in accordance with the insert element 33 shown in FIG. 3, and the convex grip bands 19 and 20 shown in FIGS. 1 and 2 may have the sectional configuration shown in FIG. 3. Furthermore, the insert element 33 may have a different hardness characteristic from the sleeve 11 as harder or softer, or it may be formed from a different material, which may be metallic or non-metallic, and may have plain surfaces instead of serrations as shown.

Figure 4:
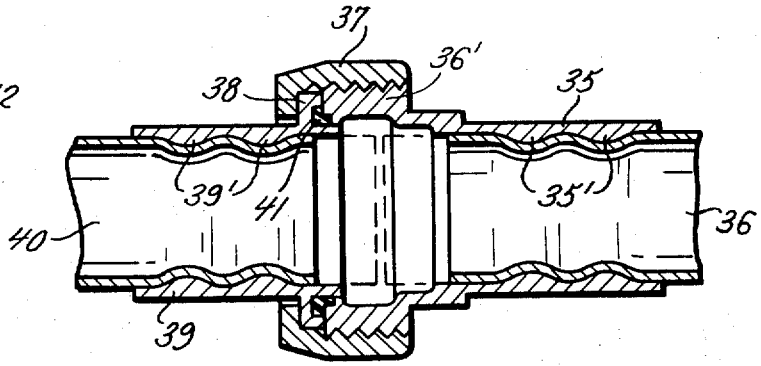
FIG. 4 is a fragmentary longitudinal sectional view showing a modified form of the present coupling fitting for connecting two tubular members.

In FIG. 4 the assembly includes a first sleeve 35 which is joined to the adjacent end of the tube 36 by one or more grip bands 35' in accordance with the foregoing description. The first sleeve 35 is provided with an outer end 36' having external threads thereon to receive and be coupled to a coupling socket 37 which is rotatively and relatively loosely mounted against the retaining flange 38 of a second sleeve 39. The sleeve 39 is joined to the end portion of a tube 40 by grip bands 39' which are of the same character, as previously pointed out. In this assembly, the sleeves 35 and 39 are assembled to the respective tubes 36 and 40 by swaging tools similar to those schematically shown in FIG. 1. Thereafter, the coupling socket 37 may be threaded over the end 36' such that a fluid type joint is established in cooperation with a gasket or seal element 41 carried by the flange 38. In this manner tubes 36 and 40 may be connected and disconnected at will which is, in certain cases, a desired feature as compared to the permanent connection shown in FIG. 2. This threaded configuration may be varied to be interchangeable with many standard connectors now in use, as AN flare-tube types and MS flareless tube types.

Figure 5:
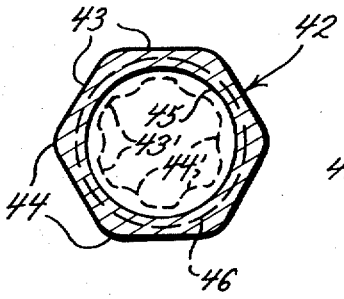
FIG. 5 is a transverse sectional view of a modified sleeve member in which the grip band shown possesses a configuration for obtaining high torque stress resistance.

In FIG. 5 a modification is shown and it may be assumed to be a transverse section at the grip bands 17 or 18 shown in FIG. 1. In this disclosure the grip band 42 has an external configuration comprising a series of circumferentially spaced flats 43 interspersed with curved projections 44. The internal surface 45 initially has a generally cylindrical configuration. On treating the sleeve shown in FIG. 5 to the swaging dies of the general character shown in FIG. 1 it can be now understood that the external configurations shown in FIG. 5 in full line will be swaged down to a substantially cylindrical surface shown in dotted line at 46 while the initially cylinderical surface 45 will take on the mirror image configuration of the external surface such that the inner surface will have projections 44' shown in dotted outline interspersed with irregularities 43'. The internal configuration shown in FIG. 5 varies from the configuration that is obtained in FIG. 2 and is therefore considerably more resistant to torsional stresses.

In some practical applications the ends 13 and 14 of the tubes 15 and 16 respectively may be roughened, as by the use of sandpaper, emery paper, or knurling devices so that the sleeve 11 when swaged into place will more securely grip the tubes. It is pointed out that in FIG. 1 each of the tube ends 13 and 14 is gripped by at least two grip bands of the sleeve 11. Variable numbers of grip bands may be utilized, from a single grip band to more than two, depending on the severity of the stress to which the fitting will be subjected. It is noted that some of the stresses sustained by the fitting may be due to low or high internal pressure conditions, and in which event the inserts or serrations 21 (FIG. 1) or 34 (FIG. 3) will furnish seals that are effective at higher pressures.

The grooves 32 of FIG. 3, required to receive the insert elements 33, may be formed by rolling, burnishing, grinding, or machining, or by any other conventional procedure. The insert element 33 may be formed of metallic materials of either ductile or brittle character or they may be formed of synthetic sealant materials such as Neoprene, Teflon, Kapton or rubber. As an alternative to inserts, grooves, or plating, various sealants or retaining compounds such as Loctite may be applied to tubing or sleeve mating surfaces.

In certain situations it may be desirable to plate or clad the external surfaces of the tubes 15 and 16 and for this purpose soft metals are preferred because of the ease with which these metals may be made to conform to the inwardly transposed swaged surfaces. Thus, silver, nickel, copper, lead, tin, aluminum and gold may be selected for coating or plating the tubes, or this may be placed over the internal surface 12 of the sleeve 11. These metals will deform and follow the surface contours and be quite susceptible to swaging techniques for establishing an effective fluid seal.

In practice, the present invention has been successfully applied with a wide variety of stainless steel and titanium tubing combined with stainless steel sleeves. The tubing has a springback characteristic which exceeds that for the sleeves, and this characteristic results in the establishment of a compressive hoop load on the tubes because of the tendency for the tubing to want to return to substantially larger size than does the sleeve. Other successful tube-sleeve combinations include steel and copper sleeves on copper tubes, steel and aluminum sleeves on aluminum tubes, and titanium sleeves on titanium tubes.

When the sleeve is placed under axial compression upon closing of the swaging dies, it extrudes through the die throat so that the finally assembled fitting will be slightly longer than the initial length of the sleeve. The extrusion reaction on the sleeve also causes a slight lengthening of the inner captive tube ends but to a different degree so that there is developed an internal axial loading due to the differential in lengthening characteristics between tube and sleeve. This causes an increase in the radial gripping action of the grip bands. Furthermore, internal fluid pressure increases the tendency to grip and seal. In FIG. 1 it is seen that the fitting 10 is abutted on the extension 23 so that when the die 26 advances axially along the fitting to radially compress the exterior configuration of the fitting inwardly, there is a tendency to develop a differential extrusion between the tube and fitting which reduces the springback of the fitting and increases its grip on the tube.

It has been found with coupling fittings of the present type that it is not particularly critical to have the tube ends touching or centered within the sleeve. Typical tube end gaps of one-half inch or more can be provided by proportional increases in the sleeve length. It has also been found that the sleeve may be roll-formed from tubular stock and that internal surface roughening, although normally not essential, may be achieved by knurling or roll surface compressing. Also, it has been found not particularly essential to clean the mating surfaces of the tubes and sleeve before assembly. The wall thickness of the sleeve 11 may be no thicker nominally than the thickness of the tube walls. The grip hands, on the other hand, provide greater strength due to thicker cross sectional configuration than cylindrical sleeves having uniform wall thickness. When axial loads are applied to such a joint the tubes must yield radially to move past the internal projecting gripping bands. This has the effect of increasing the load required to pull the tube out of the sleeve.

The present improvement has the unique characteristic of combining material, shapes, dimensions, and methods of manufacture to produce a coupling which effectively seals and joins tubing for use in fluid systems and may also have applications for joining two parts in structural applications. The transposition of the outer surface configuration of the coupling sleeve to the inner surface thereof constitutes one of the unique and useful characteristics. The grip band feature is also unique in that it provides thickened wall zones which increase the positive grip on the tubes captured in the sleeve and also increases the axial and radial loading on the tubes. When soft surface plating or insert means are used, there may be produced some amount of cold weld or fusion bond between the sleeve and the tube. It has been found that a sleeve formed of metal having less springback than the tubes to be joined thereby gives improved grip and seal qualities in addition to possessing the foregoing unique features. While springback differential characteristics may be obtained by using different metals for the tube and sleeve, a preferred characteristic may be obtained by heat treating the sleeve material to a slightly lower strength level than that of the same material in the tube.

The wall thickness of the tubes to be joined may have strength characteristics widely different from the sleeve without affecting the overall character and utility of the fitting. This means in practice that a standard sleeve may be utilized with the now known tube materials as well as with tubing to be developed in the future, and the swaging dies may be the same for all types. Since the swaging operation is performed on the outside of the sleeve, tube wall thickness variations no longer make it necessary to provide a range of internal swaging die sizes. Contamination sometimes attendant upon the operation of internal swaging dies is eliminated.

The present fitting which includes the external coupling sleeve may be assembled in its cold state to provide a permanent joint. Such a joint avoids the problems inherent in brazing and weld bands, such as complicated tooling, closer tolerances, heat effect, and the need for inert gas atmosphere and coolant fluids.

The finished joint is comparable in weight to brazed or welded joints. The axial force to be exerted on the swaging dies is about one-fifth of that required by typical radial squeeze tools which would be otherwise required to transpose the exterior grip band configurations to the internal surface. Further, the radial squeeze provides a less effective seal.

It has been found advantageous to swage only one-half of the sleeve in a normal tool swaging cycle. This permits assembly of the sleeve to one tube as a bench operation. Tool size is thereby reduced. The same basic tool may be used to assemble permanent joints as shown in FIG. 1 and threaded joints as shown in FIG. 4.

This invention is intended to cover all changes and modifications of the example of the invention herein chosen for purposes of the disclosure which do not constitute departures from the spirit and scope of the invention.

What is claimed is:

1. A coupling fitting for joining two cylindrical tubes at the adjacent ends thereof, [ said fitting including a sleeve engaged on the end of each of said two tubes one of said sleeves having an enlarged portion with external threads, the other of said sleeves having a flange thereon presented to abut said enlarged diameter portion of said one sleeve, and internally threaded fitting mounted over said flange and engaged with said external threaded portion to hold said enlarged portion and flange in abutment, and each of said sleeves with an initially cylindrical inner surface telescoped over each end portion of said tubes to be joined, the sleeves being formed with a plurality of axially spaced and radially thickened gripping bands initially formed on the exterior surface circumscribing the end portion of the tubes to be joined and which bands are transposable to said inner cylindrical surface to deform the outer surface configurations of the tubes, thereby leaving said sleeves with a final outer surface configuration of substantially cylindrical extent to conform to the cylindrical outer surfaces of the tubes. ], *each tube having a wall of uniform thickness and outer and inner cylindrical surface shape, said fitting including a sleeve engaged on the end of each of said two tubes, one of said sleeves having an enlarged diameter portion with external threads, the other of said sleeves having a flange thereon presented to abut said enlarged diameter portion of said one sleeve, an internally threaded fitting mounted over said flange and engaged with said external threaded portion to hold said enlarged portion and flange in abutment, and each of said sleeves having an initially cylindrical inner surface telescoped over an end portion of said tubes to be joined, the sleeves being formed with a plurality of axially spaced and radially thickened gripping bands initially formed on and externally projecting from the exterior surface circumscribing the end portion of the tubes to be joined and which bands are transposable through to said inner cylindrical surface to deform the outer and inner surface configuration of the tubes, thereby leaving said sleeves with a final outer configuration of substantially cylindrical extent to conform to the cylindrical outer surfaces of the tubes, said transposable bands and sleeves and said tubes being formed of materials in which said tubes have greater spring-back than said sleeves and said sleeves are lengthened differentially relative to said tubes to establish a fluid tight fitting.*

2. A coupling fitting for joining two cylindrical tubes at the adjacent ends thereof, said fitting including a sleeve engaged on the end of each of said two tubes, one of said sleeves having a portion with external threads and a seal surface, the other of said sleeves having a seat thereon presented to engage with said seal surface of said one sleeve, an internally threaded fitting mounted over said seat and engaged with said external threaded portion to hold said seal surface and said seat in abutment, and radially thickened gripping bands initially formed on the exterior surface of each fitting sleeve and circumscribing the end portion of the tubes to be joined and which bands are transposable to said inner cylindrical surface to deform the outer surface configurations of the tubes, thereby leaving said sleeves with a final outer surface configuration of substantially cylindrical extent to conform to the cylindrical outer surfaces of the tubes [.. ], *said bands and sleeve and said tubes being formed of materials in which said tubes have greater spring-back than said sleeves and said sleeves lengthen differentially relative to said tubes to establish a fluid seal.*

3. A coupling fitting for releasibly joining two pressure fluid carrying cylindrical tubes at the adjacent ends thereof, said fitting including a sleeve engaged on the end of each of said two tubes, each of said sleeves being formed with an initially cylindrical inner surface telescoped over each end portion of said tubes to be joined and with at least one radially thickened gripping band initially formed on the exterior surface circumscribing the end portion of the tubes to be joined and which bands are transposable to said inner cylindrical surface to deform the initial cylindrical outer surface configurations of the tubes, thereby leaving said sleeves with a final outer surface configuration of substantially cylindrical extent to conform to the cylindrical outer surfaces of the tubes axially beyond said sleeves, said tubes being formed of material having greater spring-back than said sleeve material *and said tubes and sleeves lengthening differentially to establish a fluid seal*, and said sleeve material being sufficiently rigid to retain the deformation and transposition of said gripping bands from the exterior thereof to said tubes, and means carried by each sleeve operable to engage each other to align said sleeves for passage of pressure fluid.

4. In a coupling assembly to releasably connect one conduit with another, the improvement [with one of the conduits to be joined having an end portion formed initially with an exterior cylindrical surface; of a coupling sleeve formed with an inner surface in fraying contact with the conduit end portion and with an outer surface having at least one radially thickened and circumferentially directed gripping band radially aligned with the end portion of the conduit; said conduit being formed of material yieldable to pressure from said gripping band and having a greater spring-back than that of said coupling sleeve, whereby on connecting said sleeve and conduit end portion the initial, radially thickened portion of said sleeve is altered by being transposed radially inwardly to reshape the exterior of said sleeve to a substantially uniform configuration with the adjacent portions of said sleeve and said transposed portion constituting a gripping band constricted about the conduit end portion, the material of said sleeve being sufficiently rigid to retain the transposition and displacement of said gripping band, and means on said sleeve to join it to another conduit. ] *of one conduit end portion having a wall with an initially cylindrical interior and exterior surface configuration, and a coupling sleeve having a wall formed with an interior cylindrical surface and an external surface contoured by at least one radially thickened externally projecting circumferentially directed band, said coupling sleeve being telescoped over said one conduit with said exterior cylindrical surface in faying contact initially with said interior cylindrical surface, said sleeve and conduit being connected by the radial transposition of said radially thickened band into said conduit wall resulting in said conduit wall being deformed in its exterior and interior surfaces by said transposed thickened band, said sleeve having a nominal wall thickness substantially equal to that of said conduit and said conduit being composed of a material having greater spring-back characteristics than the material of said sleeve whereby a compressive sealing contact is maintained in the area of the transposed circumferentially directed band.*

[5. The improvement of claim 4 in which said last means comprises a portion of said sleeve having external threads and a surface constituting a seal face.]

[6. The improvement of claim 4 in which said gripping band is non-circular and yields to external pressure without losing said non-circular configuration, whereby said sleeve and conduit end portion are united against relative turning.]

*7. In a swaged fitting assembly joining two parts in a fluid tight joint, the improvement which consists in a fluid carrying swageable part having an axially elongated*

*tubular wall sleeve formed with an internal wall surface to receive a conduit part to be connected to form the fluid tight joint, said swageable part having a portion of its sleeve wall thickened to form an external wall configuration with a radially extending enlargement transposable by swaging to the internal wall to radially inwardly deform the internal wall; a fluid carrying conduit part having an end portion formed with an external surface shaped to telescope into the sleeve of said swageable part and mate with said internal wall surface, said end portion of the conduit part being deformable upon swaging of said sleeve wall, whereby said radial enlargement upon being transposed to the internal wall correspondingly imprints its configuration into said end portion, said swageable part and sleeve wall and said conduit part being formed of metallic materials in which said conduit part has greater spring-back than said sleeve wall and said sleeve is lengthened differentially relative to said conduit part to establish the fluid tight joint.*

*8. The improvement set forth in claim 7 wherein seal and grip means is disposed between the internal wall surface of said swageable part and the external surface of said end portion of said conduit part.*

*9. The improvement set forth in claim 8 wherein seal and grip means is a metallic layer sufficiently soft to assume the swaged imprint without fracture upon transposition of said radial enlargement.*

* * * * *